(12) United States Patent
Bachman et al.

(10) Patent No.: US 7,811,443 B2
(45) Date of Patent: Oct. 12, 2010

(54) MICROFLUIDIC DYNAMIC VAPOR CONTROL SYSTEM

(75) Inventors: Mark Bachman, Irvine, CA (US); Guann-Pyng Li, Irvine, CA (US); Liang Wu, Rowland Heights, CA (US)

(73) Assignee: The Regents of the University of California, Oakland, CA (US)

( * ) Notice: Subject to any disclaimer, the term of this patent is extended or adjusted under 35 U.S.C. 154(b) by 1248 days.

(21) Appl. No.: 10/967,913

(22) Filed: Oct. 18, 2004

(65) Prior Publication Data

US 2006/0042959 A1 Mar. 2, 2006

Related U.S. Application Data

(60) Provisional application No. 60/512,311, filed on Oct. 16, 2003.

(51) Int. Cl.
*B01D 3/42* (2006.01)
(52) U.S. Cl. .................. 205/687; 203/99; 204/450
(58) Field of Classification Search .............. 205/687; 203/99
See application file for complete search history.

(56) References Cited

U.S. PATENT DOCUMENTS 4,642,165 A * 2/1987 Bier ........................ 203/12

7,316,781 B2 * 1/2008 Radomyselski et al. ..... 210/631

OTHER PUBLICATIONS

Ji et al. "Improved protein crystallization by vapor diffusion from drops in contact with transparent, self-assembled monolayers on gold-coated glass coverslips>" (2000) Journal of Crystal Growth 218 pp. 390-398.*
Wilson, L.J., Bray, T.L., and Suddath, F. I., Crystallization of proteins by dynamic control of evaporation, *Journal of Crystal Growth* 110 (1991), pp. 142-147.
Smith, H. Wilson and DeLucas, Lawrence J., A method of programmable control of reservoir concentrations for protein crystal growth, *Journal of Crystal Growth* 110 (1991), pp. 137-141.

* cited by examiner

*Primary Examiner*—Arun S Phasge
(74) *Attorney, Agent, or Firm*—Orrick, Herrington & Sutcliffe LLP

(57) ABSTRACT

A microfluidic dynamic vapor control system adapted to change the chemistry of small drops by dynamically controlling the vapor content surrounding the drops. The small volume surface area ratio makes this an efficient mechanism for controlling chemistry in nanovolumes. The system uses small reservoirs of material that can produce vapor on demand, and microfluidic channels that direct the vapor into a small chamber that holds a drop of the solution of interest. By changing the vapors that enter the chamber, the chemical composition of the drop can be modified.

15 Claims, 2 Drawing Sheets

MICROFLUIDIC DYNAMIC VAPOR CONTROL SYSTEM

CROSS-REFERENCE TO RELATED APPLICATION DATA

This application claims the benefit of U.S. provisional application No. 60/512,311, filed Oct. 16, 2003, which is incorporated herein by reference.

This invention was made with Government support under Grant No. 442521-23102 awarded by the DARPA. The Government has certain rights in this invention.

FIELD OF THE INVENTION

The present invention relates to microfluidics and, more particularly, to a method and apparatus for dynamically controlling the chemical composition within small drops of solution.

BACKGROUND OF THE INVENTION

Controlling the chemistry of small drops is troublesome owing to the difficulty in handling and metering small volumes. To change the chemistry of a 50 nl drop by 10% would require adding or removing a 5 nl quantity—a very difficult proposition. Most nanovolume assays are set up once and never modified afterwards.

Large environmental systems have been built to provide vapor controlled change of chemistry. However, these are far too bulky and inconvenient to be of use to a typical researcher and have seldom been used in nanovolume assays.

Thus, it would be desirable to provide a simple method and apparatus for vapor controlled change of the chemical compositions of small droplets.

SUMMARY OF THE INVENTION

The present invention provides a method and device for changing the chemical composition of small drops of solution (drops of less than a few microliter volume), which takes advantage of the principle that at small volumes the surface area to volume ratio is very high, and consequently, a significant amount of mass can be transferred through the surface interface of small droplets. More particularly, the method and apparatus of the invention control the local environmental humidity and temperature to facilitate the transfer of molecules in or out of a small drop of solution. By adjusting these variables, water and other molecules can be made to enter or leave the drop through the vapor phase, thereby controlling the concentration of chemical species within the drop. By providing a vapor of suitable chemistry in the region surrounding a drop, mass can be made to enter or leave the drop because the droplet will attempt to reach equilibrium with the vapor surrounding it.

The simplest example of this method is to control the concentration of water vapor surrounding the drop—control the relative humidity. By making the region surrounding the drop humid, water can be made to enter the drop—condensation. By making the environment surrounding the drop non-humid or dryer, water can be made to leave the drop—evaporation.

Other examples include changing the pH of the drop. By preparing an acidic or basic vapor in the immediate environment surrounding the drop, the pH of the drop can be caused to change. Other chemistries can be used as well, through the use of specialty gasses. For example, oxygen gas can be used to saturate the environment surrounding the drop to add oxygen into the drop. Similarly, carbon dioxide gas can be used to add carbon dioxide to the drop. By depleting the gas of interest in the region surrounding the droplet, that species can be made to move out of the drop.

The present invention includes the use of microfluidic structures (channels with dimensions of less than a few millimeters) to facilitate the transport of vapor or gasses to and from the droplet site. Reservoirs are used to store chemicals (in gas, liquid or solid phase) that will be used to provide a vapor of suitable chemistry. The reservoirs can be activated by electrical, optical or thermal means, and their gasses can be routed to the droplet region by microfluidic channels.

The method and apparatus of the present invention can also be used to change the chemical composition of one or more droplets at a time, in an array or matrix format, with reservoirs shared or not shared, and where valves can be used to assist in the routing of vapor to one or more droplets. Further, the present invention can be used with high throughput operation by employing multiple vapor-controlled experiments on a single platform, and can be used in the crystallization of biological molecules, as well as for applications in all areas of chemical and biochemical assays, including, but not limited to, protein crystallization, molecular crystallization, solubility screening, reaction screenings and titration, sample preparation, and the like.

Further, objects and advantages of the invention will become apparent from the following detailed description and accompanying drawings.

BRIEF DESCRIPTION OF THE INVENTION

Figure 1:
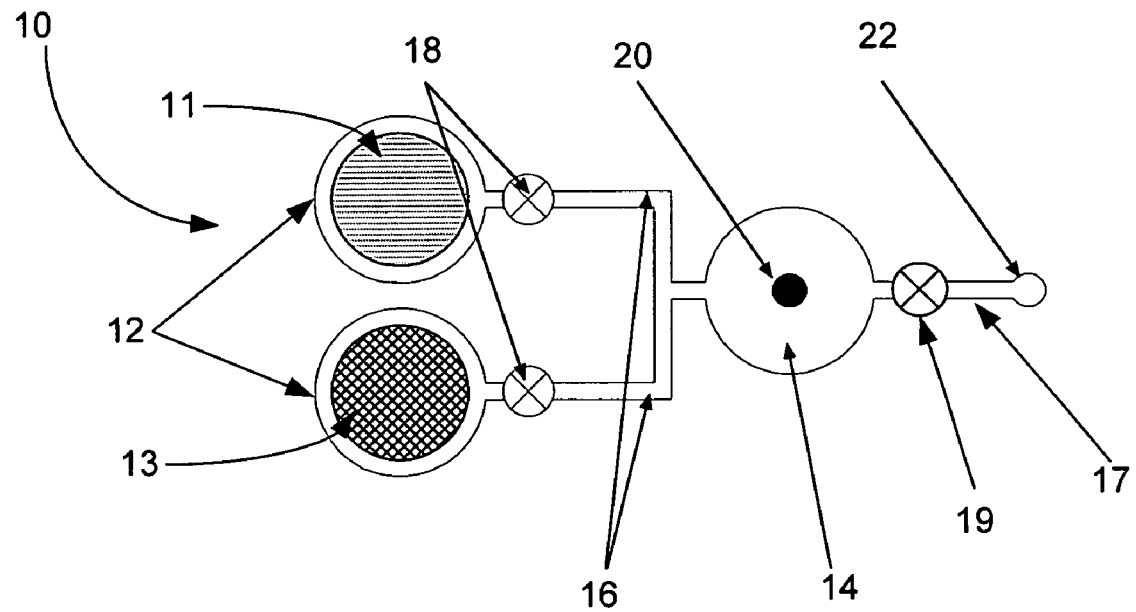
FIG. 1 depicts a schematic diagram of a vapor control system of the present invention.

The present invention includes devices and methods for changing the chemical composition of small drops of solution through dynamic vapor control. As depicted in FIG. 1, a microfluidic device 10 of the present invention includes one or more reservoirs 12 connected through small microfluidic channels 16 to a small environmental chamber 14 housing a small drop 20 of solution and preferably sealed to outside influences. The chamber 14 preferably holds a drop of solution of about five (5) microliters down to about one (1) picoliter. The drop 20 may be placed on different surfaces within the chamber 14 including: hydrophilic surfaces, hydrophobic surfaces, superhydrophobic surfaces, immiscible liquid surfaces, pedestals or drop "holders", and levitation devices such as magnetic fields (small water drops are diamagnetic and will float in a strong magnetic field).

The small channels 16, which are preferably less than five (5) millimeters wide, provide a continuous path from the vapor reservoirs 12 to the environmental chamber 14 to allow vapor to pass from the vapor reservoirs 12 to the environmental chamber 14. An exhaust channel 17 is provided to allow vapor to pass out to an exhaust port 22. The exhaust channel 17 may include a valve 19 to seal the chamber 14 from external influences. The channels 16 can include small valves 18 if desired, to help direct and control the flow of vapor from the reservoirs 12. The device 10, however, can be operated without the valves 18 and 19 in many cases. Although a preferred embodiment would include the microfluidic channels 16 to connect the reservoirs 12 with the environmental chamber 14, the vapor reservoirs 12 could be constructed in the micro-reactor or environmental chamber 14 at a position near, but not touching the drop 20.

Figure 2:
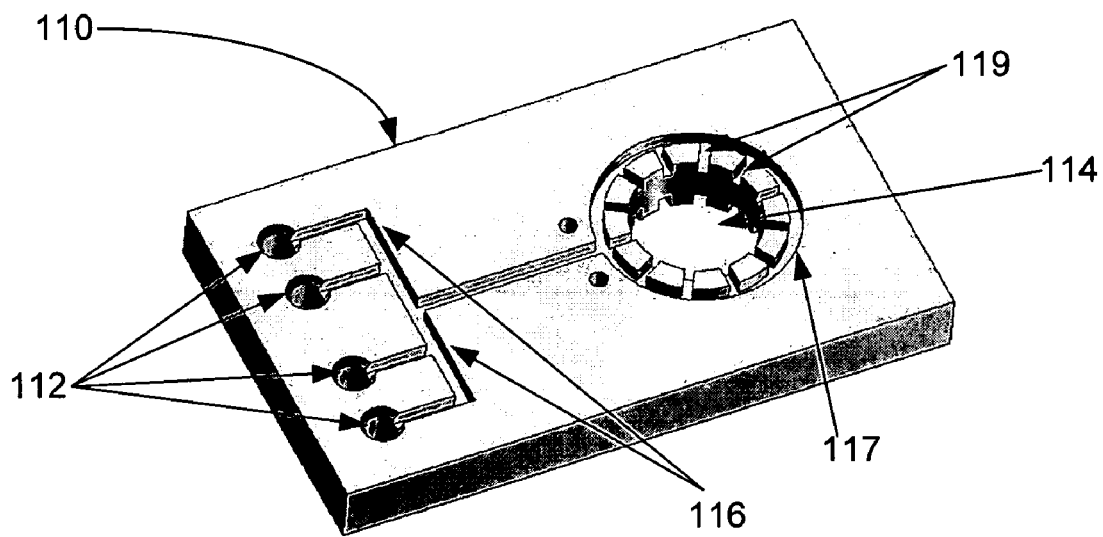
FIG. 2 depicts a microfluidic device of the present invention for performing dynamic vapor control.

FIG. 2 shows an embodiment of the microfluidic device 110 of the present invention formed from a single piece of plastic or polymer, glass, ceramic, metal, or the like. The device 110, as depicted, includes four (4) reservoirs 112 coupled to the environmental chamber 114 via a network of small channels 116. As depicted, a chamber inlet channel 117 preferably encircles the environmental chamber 114 and is in communication with the chamber 114 via a plurality of short passages 119 radiating out from the environmental chamber 114. The device 110 is preferentially sealed by bonding a second plate over the top of the device.

Turing back to FIG. 1, the vapor reservoirs 12 can contain solids, liquids, or gasses 11, 13 that can be released into the system on demand. Typically an electrical signal is used to generate the vapor, as in the electrolysis of water to generate water vapor. For example, a current is passed through two metal electrodes that are placed in a conductive solution to produce gas by hydrolysis. The gasses produced can be used as well an any vapor they collect during the bubbling through the liquid. However, heat or light can also be used to generate, gasses by causing a change in phase through boiling, melting, sublimating, or initiating reactions within the materials stored in the vapor reservoirs 12. An example system would use a resistive heater placed in or near the reservoir to change the temperature of the material. Other techniques could be used, such as the use of a focused beam of light to heat the materials (including laser light) or electromagnetic inductive heating of conductive or magnetic materials in or near the reservoir. The vapor may also be a naturally occurring product of a material in the reservoirs 12.

Figure 5:
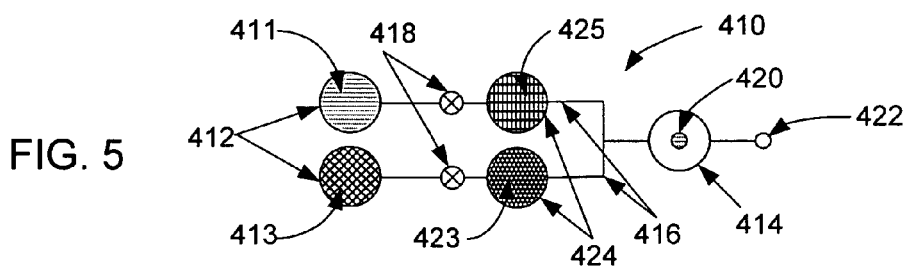
FIG. 5 depicts a schematic diagram of a vapor control system.

In addition, gas or vapor can be passed across a second material in order to transfer chemical species from the material to the gas or from the gas to the material. For example, gas can be passed across desiccant material to remove water vapor before it is directed into the environmental chamber. Another example is the bubbling of gas through a liquid to pass chemical species from the liquid to the vapor, as in bubbling through an acid or base solution. Gas may be bubbled through liquid by placing a gas channel at or near the bottom of a liquid filled reservoir, forcing it to pass through the liquid. Gas may be flowed over the top of a liquid or solid reservoir (many solids outgas) in order to populate the gas with new vapor species. In addition, gas may be passed over or through absorbent material containing liquid materials. FIG. 5 shows an alternative embodiment of the microfluidic device 410 of the present invention that allows the gas or vapor to pass across a second material. As depicted, the device 410 includes reservoirs 412 connected in series through small microfluidic channels 416 to two second material reservoirs 424 and then to an environmental chamber 414 housing a small drop 420 of solution. The small channels 416 provide a continuous path from the vapor reservoirs 412 across the second material reservoirs 424 to the chamber 414 to allow vapor to pass from the vapor reservoirs 412 to the environmental chamber 414. An exhaust channel is provided to allow vapor to pass out to an exhaust port 422. The channels 416 can include small valves 418, if desired, to help direct and control the flow of vapor from the vapor reservoirs 412 to the second material reservoirs 424.

Referring back to FIG. 1, the vapors can be directed into the environmental chamber 14 through the use of pressure gradients, positive or negative, or through the use of a thermal gradient generated between the vapor source and the drop to enhance mass transfer. For example, the vapor source is heated slightly using a heater which increases the vapor pressure of the source compared to the drop. In a preferred embodiment, the vapor reservoirs 12 generate positive pressure to force the vapor into the environmental chamber 14. Methods to do this include the electrolysis of water, boiling of liquid, or release of gas from materials by chemical reaction. The valves 18 can be used if desired, to restrict the flow of vapors in the microfluidic device 10.

Alternatively, a positive pressure gradient could be generated through external means such as a pump or other pressure source coupled to the vapor reservoirs 12. Similarly, a negative pressure gradient could be generated by a vacuum pump coupled to the chamber 14 or exhaust port 22. In addition, internal pumps, outgassers, absorbers, and getteres may be used to modify the pressure. In another alternative, the vapor flow may be controlled through the use of laminar flow where a second gas flow is used to direct the vapor in or out of the environmental chamber 14.

The chamber 14 can include temperature control to enhance the rate of mass transfer to and from the droplet 20 and the vapor. Temperature may be increased or decreased through resistive heaters, refrigerants, cooling and heating lines, or solid state devices such as thermo-electric heat pumps. In addition, heat may be applied externally, as described previously through light, electromagnetic induction, conduction and the like. Temperature may be monitored by thermal sensors embedded in the system or external to the system. Alternatively, the system could undergo large changes in temperature and pressure during operation. For example, the device can be used as a miniature, high speed freeze-dryer.

The device 10 can be operated at atmospheric pressure or at different pressures from atmospheric pressure. Pressure may be modified by the addition of tubes that provide gas pressure or vacuum to a sealed, or nearly sealed device. Additionally, the device may be operated within an external vessel at pressures above or below atmospheric pressure.

In addition, system feedback may be built into in the system, including the use of humidity sensors, temperature sensors, and chemical sensors in the reservoirs 12, channels 16, or reaction chamber 14. Other feedback built into the system may include optically observing the drop 20 to modify the vapors that are generated. For example, it may be desirable to monitor the color or turbidity of the drop 20 and modify the vapor system accordingly.

Figure 3:
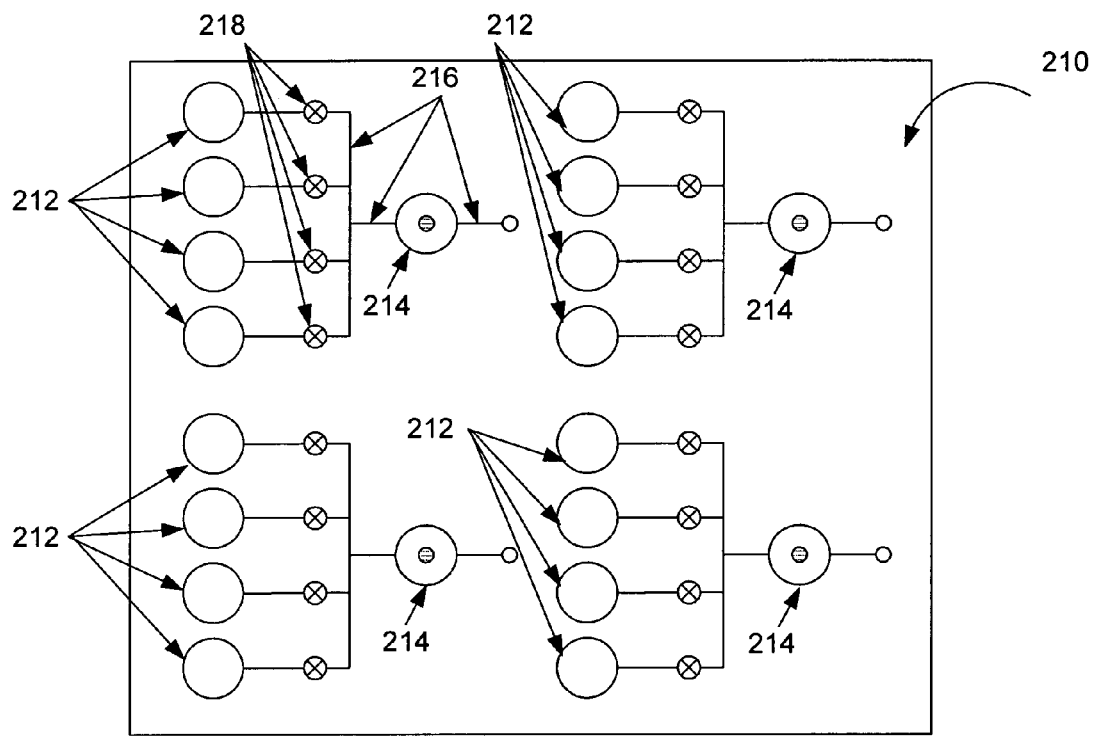
FIG. 3 depicts a schematic diagram of a vapor control system array.
Figure 4:
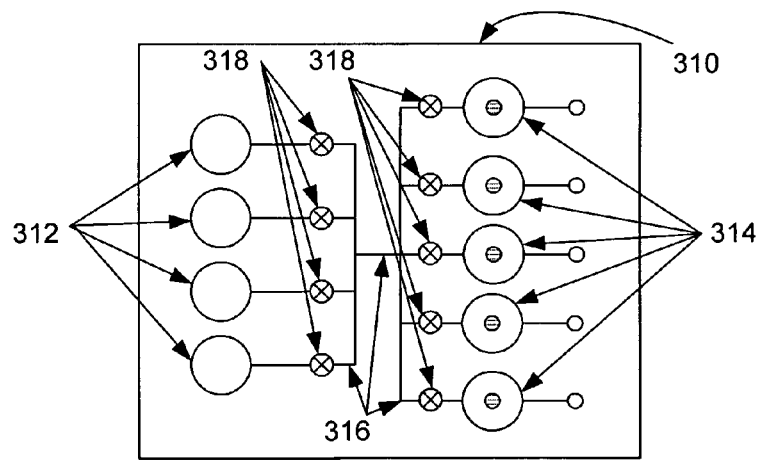
FIG. 4 depicts a schematic diagram of a vapor control system matrix.

The components of the vapor control system of the present invention can all be built on the same structural material. The environmental chambers can be configured in an array or matrix to facilitate large numbers of experiments to be performed simultaneously. As shown in FIGS. 3 and 4, the system 210 and 310 can include multiple environmental chambers 214 and multiple vapor reservoirs 212 and 312. The reservoirs 212 and 312 can be connected to a single chamber 214 as depicted in FIG. 3, or multiple chambers 314 as depicted in FIG. 4. Routing of the vapors can include the use of valves 218 and 318. In FIG. 4, first and second valves 318 are opened to couple a particular reservoir 312 to a particular chamber 314.

In operation, a method for changing the chemical composition of small drops includes generating vapor in at least one reservoir 12 and directing the vapor from the reservoir 12 to an environmental chamber 14 in which a small drop 20 of solution is stored. The droplet 20 is preferably less than five (5) microliters. The vapor generated in the reservoir 12 can be generated through electrolysis of water stored in the reservoir 12, through a change of phase of material stored in the reservoir 12, through a chemical reaction of material stored in the reservoir 12, through thermal change of material stored in the reservoir 12, through the application of light to a material stored in the reservoir 12, or as a naturally occurring product of a material in the reservoir 12.

The vapor is preferably directed through small channels 16 having a width of 5 mm or less from the reservoir 12 to the environmental chamber 14. The channels 16 provide a continuous path from the vapor reservoir 12 to the camber 14. If desirable, the vapor flow through the channels 16 can be restricted or controlled using valves 18 and assisted by applying pressure with an external pressure source.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed:

1. A method of changing the chemical composition of a sample comprising the steps of
   generating vapor in at least one reservoir,
   directing the vapor from the reservoir to an environmental chamber containing the sample including assisting vapor flow by applying pressure with an external pressure source, and
   changing the chemical composition of the sample due to contact with the vapor.

2. The method of claim 1 wherein the sample contained in the environmental chamber is a droplet of solution.

3. The method of claim 2 wherein the droplet of solution is less than five (5) microliters.

4. The method of claim 1 wherein the step of generating vapor includes generating a vapor through a change of phase of material stored in the reservoir.

5. The method of claim 1 wherein the step of generating vapor includes generating a vapor through a chemical reaction of material stored in the reservoir.

6. The method of claim 1 wherein the step of generating vapor includes generating a vapor through thermal change of material stored in the reservoir.

7. The method of claim 1 wherein the step of generating vapor includes generating a vapor through the application of light to a material stored in the reservoir.

8. The method of claim 1 wherein vapor is generated as a naturally occurring product of a material in the reservoir.

9. The method of claim 1 wherein the chamber is sealed to outside influences.

10. The method of claim 1 wherein the chamber can hold a solution of 5 microliters down to 1 picoliter.

11. The method of claim 1 wherein the step of directing vapor from the reservoir to the environmental chamber includes vapor being directed through small channels of 5 nm or less in dimension.

12. The method of claim 11 wherein the channels provide a continuous path from the vapor reservoir to the camber.

13. A method of changing the chemical composition of a sample comprising the steps of
    generating vapor in at least one reservoir,
    directing the vapor from the reservoir to an environmental chamber containing the sample, wherein the vapor being directed through small channels of 5 nm or less in dimension, and wherein the channels include valves to restrict the flow of vapor, and changing the chemical composition of the sample due to contact with the vapor.

14. A method of changing the chemical composition of a sample comprising the steps of generating vapor in at least one reservoir through electrolysis of water stored in the reservoir,
    directing the vapor from the reservoir to an environmental chamber containing the sample, and
    changing the chemical composition of the sample due to contact with the vapor.

15. A method of changing the chemical composition of a sample comprising the steps of
    generating vapor in at least one reservoir,
    directing the vapor from the reservoir to an environmental chamber containing the sample including routing the vapor past a second material for the purpose of changing the composition of the vapor, and
    changing the chemical composition of the sample due to contact with the vapor.

* * * * *